US012656318B2

(12) United States Patent
Jang et al.

(10) Patent No.: US 12,656,318 B2
(45) Date of Patent: Jun. 16, 2026

(54) PIPE EVALUATION ROBOT AND PIPE EVALUATION METHOD

(71) Applicant: KOREA HYDRO & NUCLEAR POWER CO., LTD, Gyeongju-si (KR)

(72) Inventors: You Hyun Jang, Daejeon (KR); Eun Hye Song, Daejeon (KR)

(73) Assignee: KOREA HYDRO & NUCLEAR POWER CO., LTD, Gyeongju-si (KR)

( * ) Notice: Subject to any disclaimer, the term of this patent is extended or adjusted under 35 U.S.C. 154(b) by 572 days.

(21) Appl. No.: 18/257,075

(22) PCT Filed: Apr. 29, 2022

(86) PCT No.: PCT/KR2022/006163
§ 371 (c)(1),
(2) Date: Dec. 5, 2023

(87) PCT Pub. No.: WO2022/231372
PCT Pub. Date: Nov. 3, 2022

(65) Prior Publication Data
US 2025/0271400 A1     Aug. 28, 2025

(30) Foreign Application Priority Data
Apr. 30, 2021     (KR) ........................ 10-2021-0056611

(51) Int. Cl.
*G01N 29/12*          (2006.01)
*B25J 5/00*           (2006.01)
(Continued)

(52) U.S. Cl.
CPC .............. *G01N 29/12* (2013.01); *F16L 55/40* (2013.01); *G01N 29/226* (2013.01);
(Continued)

(58) Field of Classification Search
CPC .... G01N 29/12; G01N 29/226; G01N 29/265; G01N 29/34; G01N 29/4481;
(Continued)

(56) References Cited

U.S. PATENT DOCUMENTS

2019/0017973 A1* 1/2019 Enamito ................ G01N 29/14
2022/0316643 A1* 10/2022 Rigi ........................ F16L 55/32

FOREIGN PATENT DOCUMENTS

JP          2006-3319 A       1/2006
JP        2013134172 A    *  7/2013
(Continued)

OTHER PUBLICATIONS

The Extended European Search Report for European Patent Application No. 22796204.0, dated Feb. 14, 2025.
(Continued)

*Primary Examiner* — Peter J Macchiarolo
*Assistant Examiner* — Thomas M Hammond, III

(57)          ABSTRACT

The present invention is to provide a pipe evaluation robot and a pipe evaluation method, in which a robot may be injected into a pipe to generate a reverberation sound and to determine soundness of the pipe on the basis of the reverberation sound, wherein the pipe evaluation robot comprises: a body injected into a pipe; a transfer module which transfers the body inside the pipe; a striking unit provided in the body to strike the pipe; a plurality of acoustic measurement modules provided in the body to measure a striking sound generated when the striking unit strikes the pipe; and a reverberation sound analysis module which converts striking sound information provided through the acoustic measurement modules into analysis data and applies the converted analysis data to a convolutional neural network (CNN) to determine soundness of the pipe.

12 Claims, 9 Drawing Sheets

(51) Int. Cl.

| | |
|---|---|
| *B25J 9/16* | (2006.01) |
| *B62D 57/028* | (2006.01) |
| *F16L 55/32* | (2006.01) |
| *F16L 55/40* | (2006.01) |
| *F16L 101/30* | (2006.01) |
| *G01H 1/00* | (2006.01) |
| *G01N 29/04* | (2006.01) |
| *G01N 29/22* | (2006.01) |
| *G01N 29/265* | (2006.01) |
| *G01N 29/34* | (2006.01) |
| *G01N 29/44* | (2006.01) |
| *G01N 29/46* | (2006.01) |
| *G06N 3/0464* | (2023.01) |
| *G21C 17/017* | (2006.01) |

(52) U.S. Cl.
CPC ........... *G01N 29/265* (2013.01); *G01N 29/34* (2013.01); *G01N 29/4481* (2013.01); *G01N 29/46* (2013.01); *B25J 5/005* (2013.01); *B25J 9/1674* (2013.01); *B62D 57/028* (2013.01); *F16L 55/32* (2013.01); *F16L 2101/30* (2013.01); *G01H 1/00* (2013.01); *G01N 29/045* (2013.01); *G01N 2291/014* (2013.01); *G01N 2291/2636* (2013.01); *G05B 2219/37337* (2013.01); *G05B 2219/45066* (2013.01); *G05B 2219/45233* (2013.01); *G06N 3/0464* (2023.01); *G21C 17/017* (2013.01)

(58) Field of Classification Search
CPC ............. G01N 29/46; G01N 2291/014; G01N 2291/2636; G01N 2291/015; G01N 29/045; F16L 55/40; F16L 2101/30; F16L 55/32; G06N 3/0464; B25J 5/005; B25J 9/1674; B62D 57/028; G01H 1/00; G05B 2219/37337; G05B 2219/45066; G05B 2219/45233; G21C 17/017
USPC .......................................... 73/579
See application file for complete search history.

(56) References Cited

FOREIGN PATENT DOCUMENTS

| | | | |
|---|---|---|---|
| JP | 5837818 | B2 | 12/2015 |
| JP | 2018004312 | A * | 1/2018 |
| JP | 2018128403 | A * | 8/2018 |
| JP | 2020-56254 | A | 4/2020 |
| KR | 10-1153125 | B1 | 6/2012 |
| KR | 10-1171920 | B1 | 8/2012 |
| KR | 10-1719362 | B1 | 4/2017 |
| KR | 10-2191736 | B1 | 12/2020 |
| WO | 2021/068848 | A1 | 4/2021 |

OTHER PUBLICATIONS

Jeffrey S. Sarmiento et al., "Non-destructive Bridge Pavement Detection Using Impact Sound and Convolutional Neural Network," ICCAI '19: Proceedings of the 2019 5th International Conference on Computing and Artificial Intelligence, Apr. 19, 2019.
Shuai Han et al., "A Deep Learning Based Method for the Non-Destructive Measuring of Rock Strength through Hammering Sound," Applied Sciences, Aug. 23, 2019.

* cited by examiner

Figure 8:
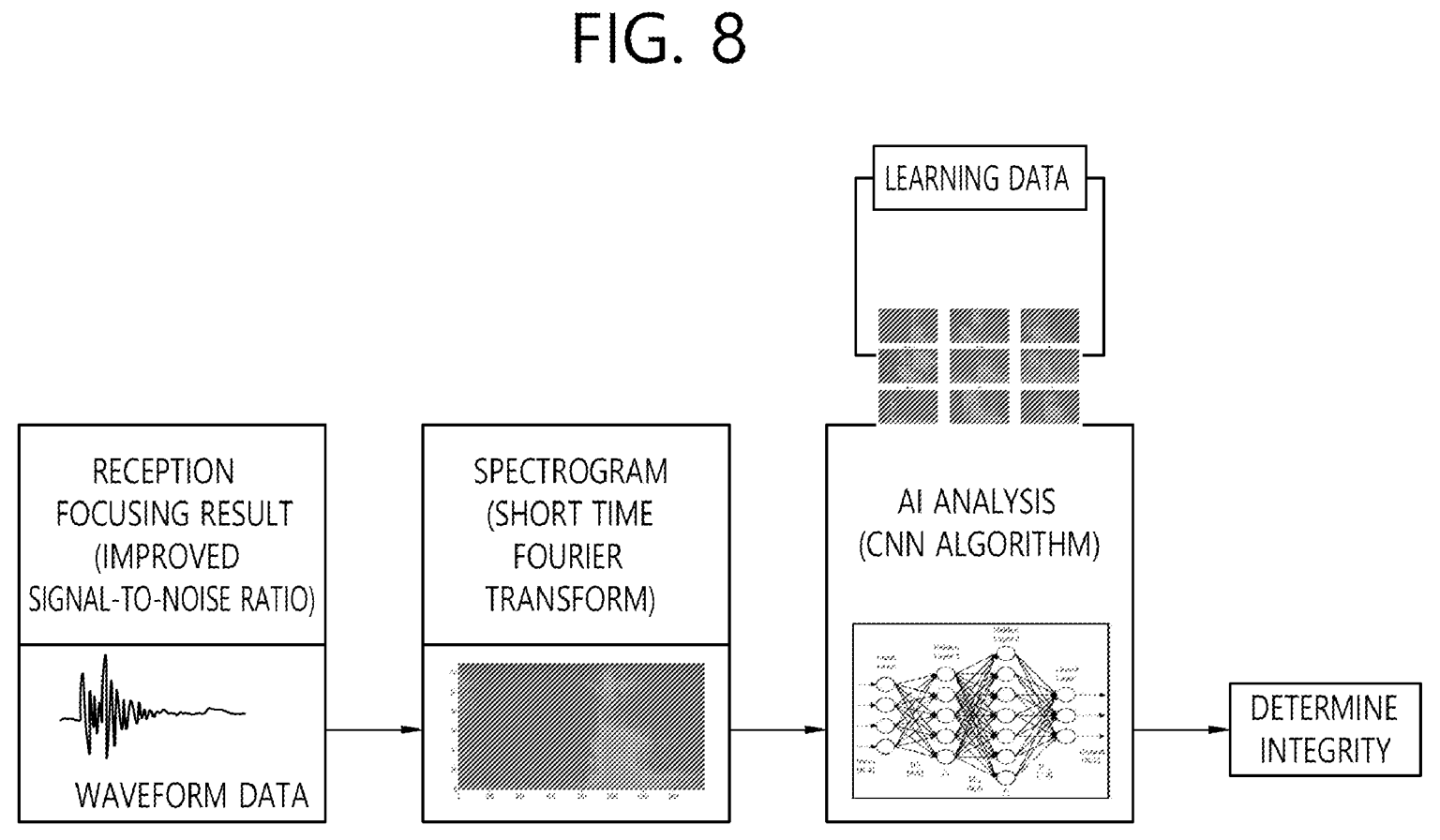

RECEPTION FOCUSING RESULT (IMPROVED SIGNAL-TO-NOISE RATIO)

WAVEFORM DATA

SPECTROGRAM (SHORT TIME FOURIER TRANSFORM)

LEARNING DATA

AI ANALYSIS (CNN ALGORITHM)

DETERMINE INTEGRITY

PIPE EVALUATION ROBOT AND PIPE EVALUATION METHOD

CROSS-REFERENCE TO RELATED APPLICATIONS

This application is the National Stage filing under 35 U.S.C. 371 of International Application No. PCT/KR2022/006163, filed on Apr. 29, 2022, which claims the benefit of KR Patent Application No. 10-2021-0056611 filed on Apr. 30, 2021, the contents of which are all hereby incorporated by reference herein in their entirety.

TECHNICAL FIELD

The present disclosure relates to a pipe evaluation robot and a pipe evaluation method and, more particularly, to a pipe evaluation robot and a pipe evaluation method for evaluating pipes in the field of nuclear power plants.

BACKGROUND ART

In general, a lot of pipes are required for the installation of a nuclear power plant, and the condition of the pipes is periodically inspected for smooth operation of the nuclear power plant. Moreover, when a defect is found or predicted in a pipe, measures are taken for that pipe. This conventional pipe inspection method has already been published in "Korean Patent No. 10-1171920 (SYSTEM FOR SELECTING TARGETS OF INSPECTION OF CLASS 1 AND 2 PIPING AND METHOD THEREFOR, Aug. 1, 2012)".

According to a general pipe inspection method, a worker enters a pipe, inspects the surface of the pipe with the naked eye, impacts an abnormal part with a hammer, and listens to a resonance sound. At this time, if a lot of sound is generated based on the height of the impact sound, the worker determines the pipe as normal, and if a dull sound is generated, the worker determines the pipe as abnormal, and proceeds with inspection records.

However, due to the fact that the pipes of the nuclear power plant are connected between reactor units, irregular background noise of the power plant in normal operation occurs in the pipes under maintenance. Therefore, errors occur in the qualitative integrity evaluation of the pipes through impact sound analysis, and the accuracy of sound analysis may not be maintained depending on the worker's condition. Moreover, for some pipes, the working environment is very poor due to the presence of mud sediments contained in seawater, and harmful gases may be generated in the enclosed area due to organic corrosion in the sediments, which can cause very dangerous accidents such as suffocation of the worker.

DISCLOSURE

Technical Problem

An object of the present disclosure is to provide a pipe evaluation robot and a pipe evaluation method that can introduce a robot into a pipe to generate a resonance sound and determine the integrity of the pipe based on the same.

Technical Solution

A pipe evaluation robot for evaluating the integrity of a pipe according to the present disclosure may comprise: a body that is introduced into the pipe; a transfer module that transfers the body inside the pipe; an impact unit that is provided in the body to impact the pipe; a plurality of acoustic measurement modules that are provided in the body to measure an impact sound generated when the impact unit impacts the pipe; and a resonance sound analysis module that converts impact sound information provided from the acoustic measurement modules into analysis data and applies the converted analysis data to a convolutional neural network (CNN) to determine the integrity of the pipe.

The resonance sound analysis module may obtain first analysis data as the impact unit impacts a predetermined area and obtain second analysis data as the impact unit impacts a plurality of predetermined areas.

The resonance sound analysis module may obtain a first analysis result by generating spectrogram data based on the first analysis data and applying the spectrogram data to a first convolutional neural network, and obtain a second analysis result by generating 3D power spectrum data based on the second analysis data and applying the 3D power spectrum data to a second convolutional neural network.

The resonance sound analysis module may evaluate the integrity of the pipe based on the first and second analysis results.

In obtaining the first analysis data, the resonance sound analysis module may compensate for a difference in arrival time of the impact sounds input to each of the plurality of acoustic measurement modules and then overlap a plurality of signals to generate the first analysis data in the form of waveform data with an improved signal-to-noise ratio.

In obtaining the second analysis data, the resonance sound analysis module may obtain a three-dimensional data matrix for each impact sound receiving position, compensate for a difference in arrival time of the impact sounds input to each of the plurality of acoustic measurement modules, and then form a power spectrum array for each position based on the waveform data to generate the second analysis data in the form of a waveform data matrix.

The resonance sound analysis module may generate the 3D power spectrum data by extracting a frequency region of interest from the waveform data matrix before applying the second analysis data to the second convolutional neural network.

In generating the 3D power spectrum data, the resonance sound analysis module may extract a maximum frequency component from the waveform data matrix.

The impact unit may comprise: an impact hammer that impacts the pipe; and an articulated robot arm that allows the impact hammer to be supported on the body and the impact hammer to be transferred in multiple directions.

The articulated robot arm may comprise: a first robot arm of which one end is connected to the body and the other end extends upward from the body to be axially rotatable in a plane direction and in a vertical direction; a second robot arm of which one end is connected to the other end of the first robot arm and the other end extends upward to be axially rotatable on the other end of the robot arm; and a third robot arm extending from the other end of the robot arm in a horizontal direction and axially rotatable in a plane direction, and the impact hammer may be mounted on the third robot arm.

The transfer module may switch to a driving mode or a walking mode.

The transfer module may comprise: a first transfer unit that is selectively axially rotated toward the front and right sides in a lower area of the body; a second transfer unit that is selectively axially rotated toward the front and left sides in the lower area of the body; a third transfer unit that is selectively axially rotated toward the rear and right sides in the lower area of the body; and a fourth transfer unit that is selectively axially rotated toward the rear and left sides in the lower area of the body.

Each of the first to fourth transfer units may comprise: a first transfer frame that is connected to the lower area of the body to be axially rotated in the x-axis or y-axis direction and axially rotatable with respect to the body; a second transfer frame that is connected to the first transfer frame and axially rotatable with respect to the first transfer frame, and a transfer member in the form of a caterpillar that is axially rotatably connected to the second transfer frame.

The pipe evaluation robot may further comprise a camera module provided on the body, and the camera module may be axially rotatably mounted on a top of the body.

Meanwhile, a pipe evaluation method for evaluating the integrity of a pipe according to the present disclosure may comprise: introducing a pipe evaluation robot into the pipe; impacting, by an impact unit of the pipe evaluation robot, the pipe; measuring, by a plurality of acoustic measurement modules provided in the pipe evaluation robot, an impact sound generated when the impact unit impacts the pipe; and converting impact sound information provided from the acoustic measurement modules into analysis data and applying the converted analysis data to a convolutional neural network (CNN) to determine the integrity of the pipe.

Advantageous Effects

The pipe evaluation robot and the pipe evaluation method according to the present disclosure have the effect of reducing the occurrence of human errors and safety accidents through pipe evaluation using a robot and enabling accurate pipe evaluation.

The technical effects of the present disclosure are not limited to those mentioned above, and other technical effects not mentioned will be clearly understood by those skilled in the art from the description below.

DESCRIPTION OF DRAWINGS

FIG. 6 is a conceptual diagram showing obtaining first analysis data using the pipe evaluation robot according to the preferred embodiment of the present disclosure;

FIG. 8 is a conceptual diagram showing generating a spectrogram and performing convolutional neural network analysis using the pipe evaluation robot according to the preferred embodiment of the present disclosure.

MODE FOR DISCLOSURE

Figure 1:
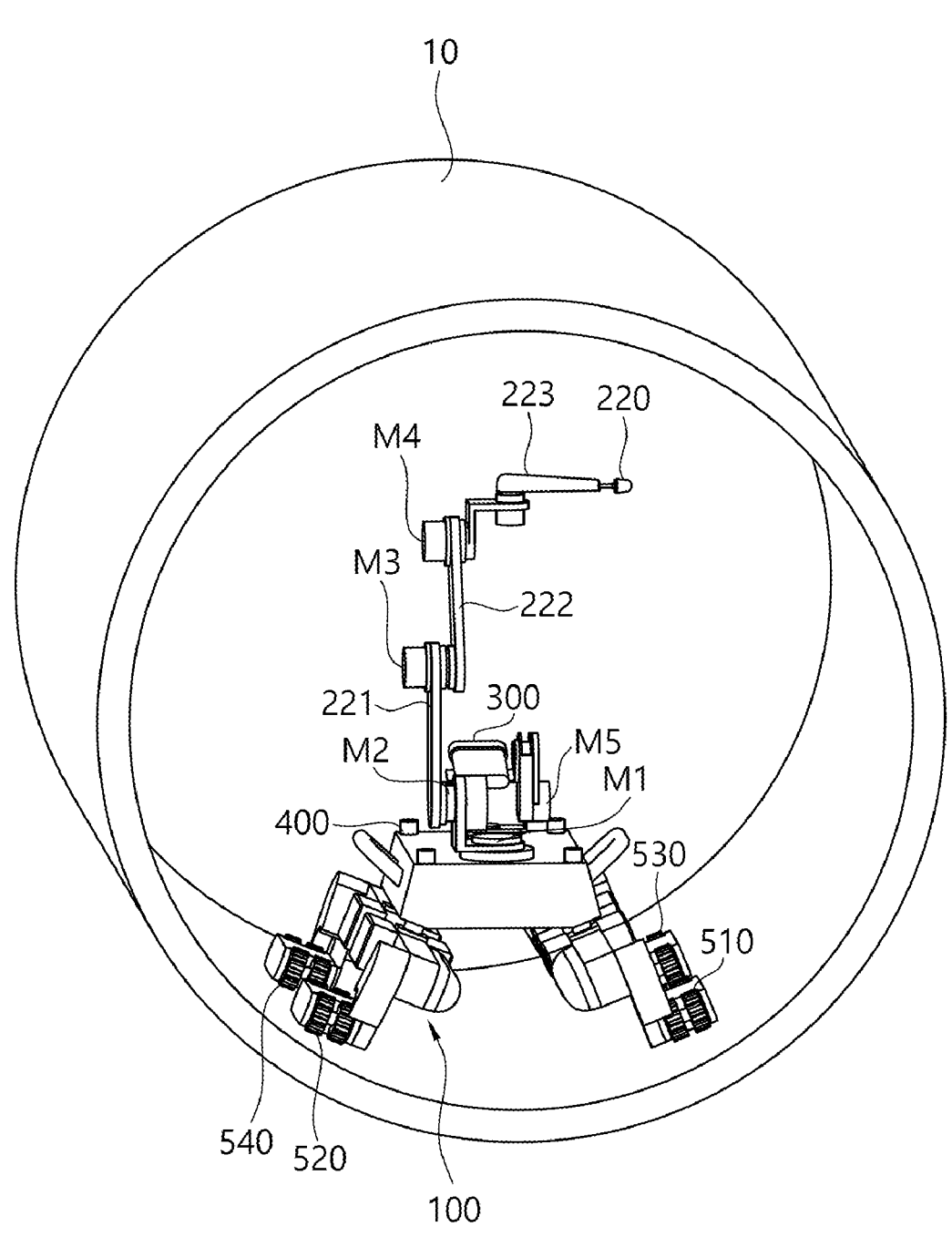
FIG. 1 is a perspective view schematically showing a pipe evaluation robot according to a preferred embodiment of the present disclosure.

Hereinafter, embodiments of the present disclosure will be described in detail with reference to the accompanying drawings. However, the present disclosure is not limited to the embodiments disclosed below and may be implemented in various different forms. The embodiments are provided only to complete the present disclosure and to allow those skilled in the art to which the present disclosure pertains to fully understand the scope of the present disclosure. The shapes of elements in the drawings may be exaggerated for clarity of description, and the elements denoted by the same reference numerals in the drawings refer to the same elements.

Figure 2:
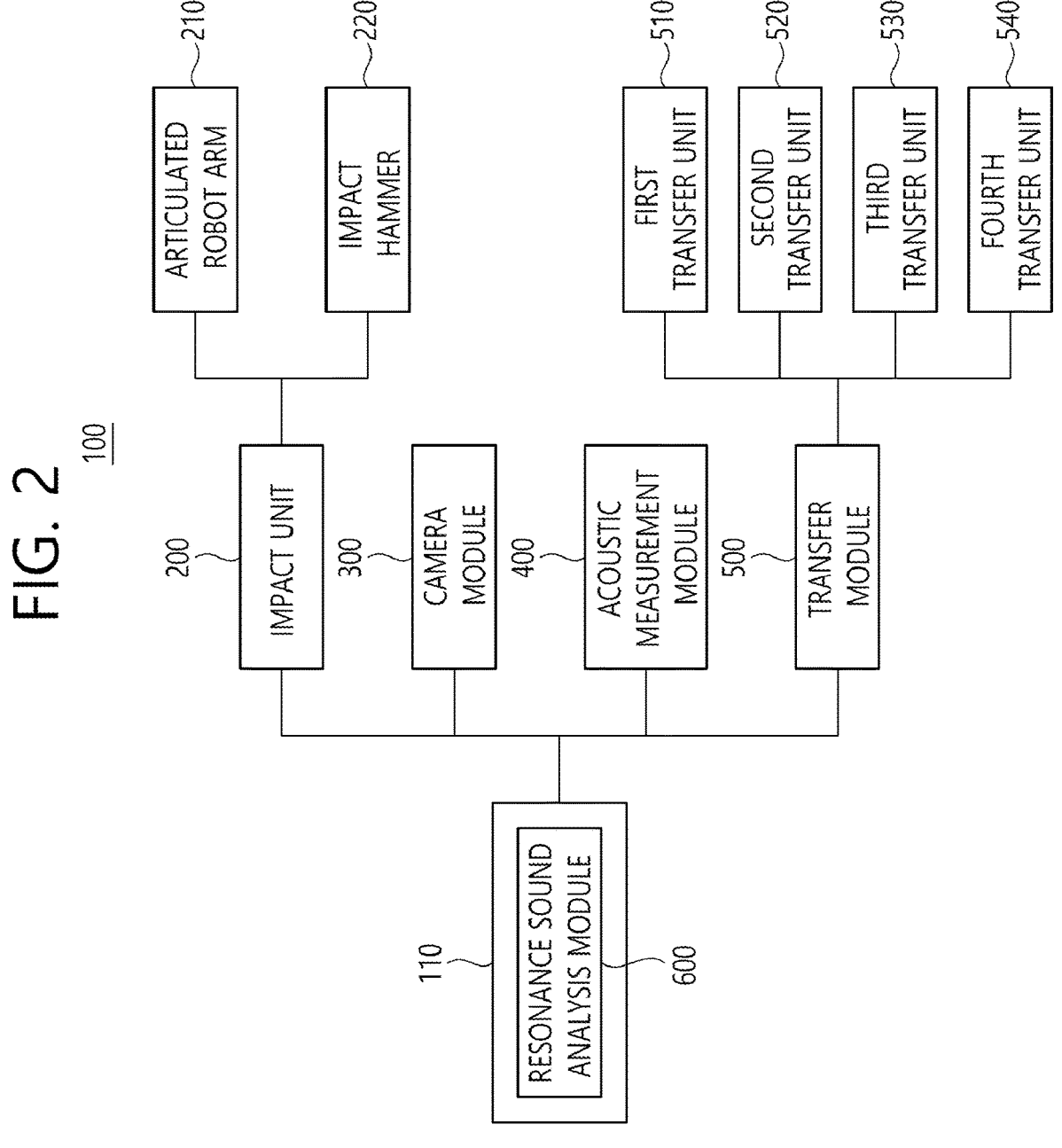
FIG. 2 is a block diagram schematically showing the pipe evaluation robot according to the preferred embodiment of the present disclosure.

FIG. 1 is a perspective view schematically showing a pipe evaluation robot according to a preferred embodiment of the present disclosure, and FIG. 2 is a block diagram schematically showing the pipe evaluation robot according to the preferred embodiment of the present disclosure.

As shown in FIGS. 1 and 2, the pipe evaluation robot 100 according to a preferred embodiment of the present disclosure may be introduced into a pipe 10 in a nuclear power plant environment to evaluate the integrity of the pipe 10. However, this is for the purpose of illustrating the present embodiment and does not limit the working environment of the pipe evaluation robot 100, and the pipe evaluation robot 100 may be applied to various environments to evaluate the integrity of the pipe 10.

The pipe evaluation robot 100 may comprise a body 110. The body 110 may be made of a rigid material and comprise a resonance sound analysis module 600 mounted therein.

Moreover, an impact unit 200 for impacting the pipe 10 after the pipe evaluation robot 100 enters the pipe 10 may be mounted on the body 110. The impact unit 200 may comprise an articulated robot arm 210 and an impact hammer 220.

The articulated robot arm 210 may comprise a first robot arm 221, a second robot arm 222, and a third robot arm 223 to impact a desired position using the impact hammer 220.

For example, one end of the first robot arm 221 may be connected to the body 110 and the other end thereof may extend upward from the body 110. Here, the first robot arm 221 may be rotated in a plane direction by a first power source M1. Moreover, the first robot arm 221 may be axially rotated in a vertical direction with respect to the body by a second power source M2.

One end of the second robot arm 222 may be connected to the other end of the first robot arm 221 and the other end thereof may extend upward to be axially rotatable. At this time, the second robot arm 222 may be axially rotated by a third power source M3.

The third robot arm 223 may extend from the other end of the second robot arm 222 in a horizontal direction. The third robot arm 223 may be axially rotated in a plane direction with respect to the other end of the second robot arm 222 by a fourth power source M4. However, this is for the purpose of illustrating the present embodiment, and the articulated robot arm 210 may be changed in various ways.

The impact hammer 220 may be mounted on a free end of the third robot arm 223 to impact a desired position according to the posture change of the articulated robot arm 210.

Meanwhile, a camera module 300 may be mounted on the body 110. The camera module 300 may be disposed on a top of the body 110 to be axially rotated by a fifth power source M5. The camera module 300 may capture an area required for the transfer of the robot and the integrity evaluation of the pipe 10 such that the capture photographed information can be transmitted to a worker operating the pipe evaluation robot 100.

Moreover, a plurality of acoustic measurement modules 400 may be mounted on the body 110. The acoustic measurement modules 400 may comprise a microphone, and each may be disposed in a predetermined position. However, the present embodiment describes that a total of four acoustic measurement modules 400 is provided, but this is for the purpose of illustrating the present embodiment, and the number of acoustic measurement modules 400 may be variously changed. The plurality of acoustic measurement modules 400 may receive an impact sound through multiple channels for the evaluation of the pipe 10. The evaluation of the pipe 10 based on the plurality of acoustic measurement modules 400 will be described again below.

Meanwhile, a transfer module 500 that transfers the pipe evaluation robot 100 may be mounted on the body 110. The transfer module 500 may comprise a first transfer unit 510, a second transfer unit 520, a third transfer unit 530, and a fourth transfer unit 540 to smoothly transfer the pipe evaluation robot 100 inside the pipe 10.

For example, the first transfer unit 510 may be mounted on the lower area of the body 110 to be axially rotatable toward the front and right sides, and the second transfer unit 520 may be mounted on the lower area of the body 110 to be axially rotatable toward the front and left sides. Moreover, the third transfer unit 530 may be mounted on the lower area of the body 110 to be axially rotatable toward the rear and right sides, and the fourth transfer unit 540 may be mounted on the lower area of the body 110 to be axially rotatable toward the rear and left sides.

Each of the first transfer unit 510, the second transfer unit 520, the third transfer unit 530, and the fourth transfer unit 540 may comprise a first transfer frame 501, a second transfer frame 502, and transfer member 503.

For example, one end of the first transfer frame 501 may be connected to the lower area of the body 110 to be axially rotatable in the x-axis or y-axis direction and axially rotatable with respect to the body 110. One end of the second transfer frame 502 may be connected to the other end of the first transfer frame 501 to be axially rotatable with respect to the first transfer frame 501. One end of the transfer member 503 may be connected to the other end of the second transfer frame 502 to be axially rotatable with respect to the second transfer frame 502. Here, the transfer member 503 may be provided in the form of a caterpillar.

The transfer module 500 may switch to a driving mode or a walking mode depending on driving conditions to allow the pipe evaluation robot 100 to be stably transferred regardless of the environment.

Next, the driving mode of the pipe evaluation robot 100 will be described.

Figure 3:
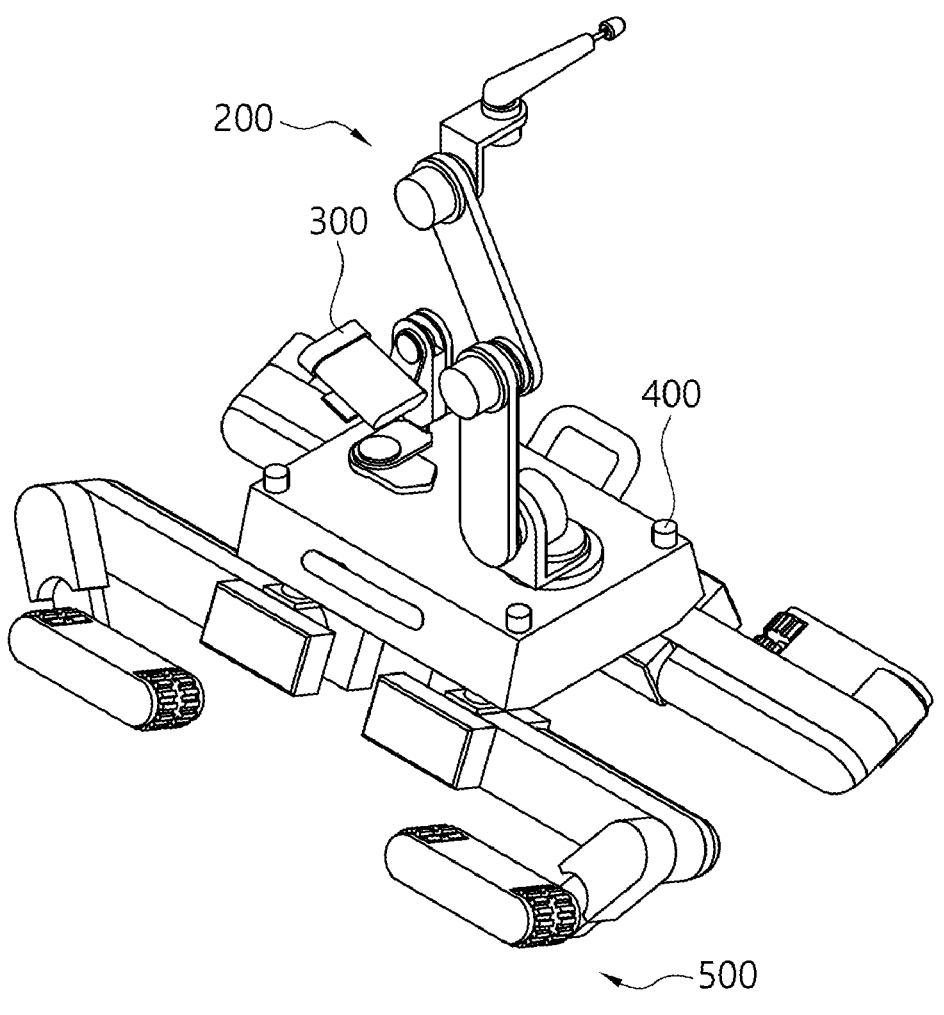
FIG. 3 is a perspective view showing the driving posture of the pipe evaluation robot according to the preferred embodiment of the present disclosure.

FIG. 3 is a perspective view showing the driving posture of the pipe evaluation robot according to the preferred embodiment of the present disclosure.

As shown in FIG. 3, the pipe evaluation robot 100 according to a preferred embodiment of the present disclosure may be operated in a normal driving mode. At this time, the pipe evaluation robot 100 may be driven in a state where the transfer members 503 of the first transfer unit 510, the second transfer unit 520, the third transfer unit 530, and the fourth transfer unit 540 are in contact with the ground.

For example, the first transfer frame 501 may be disposed parallel to the body 110 while it is axially rotated in the x-axis direction. The second transfer frame 502 may be axially rotated at an angle downward, and the transfer member 503 may be disposed parallel to the body 110 to allow the pipe evaluation robot 100 to be stably driven based on the caterpillar. At this time, the direction change of the pipe evaluation robot 100 may be made based on the axial rotation of the first transfer frame 501.

The pipe evaluation robot 100 may be transported in walking mode when it is difficult to move due to mud sediments, etc. contained in the pipe 10.

Figure 4:
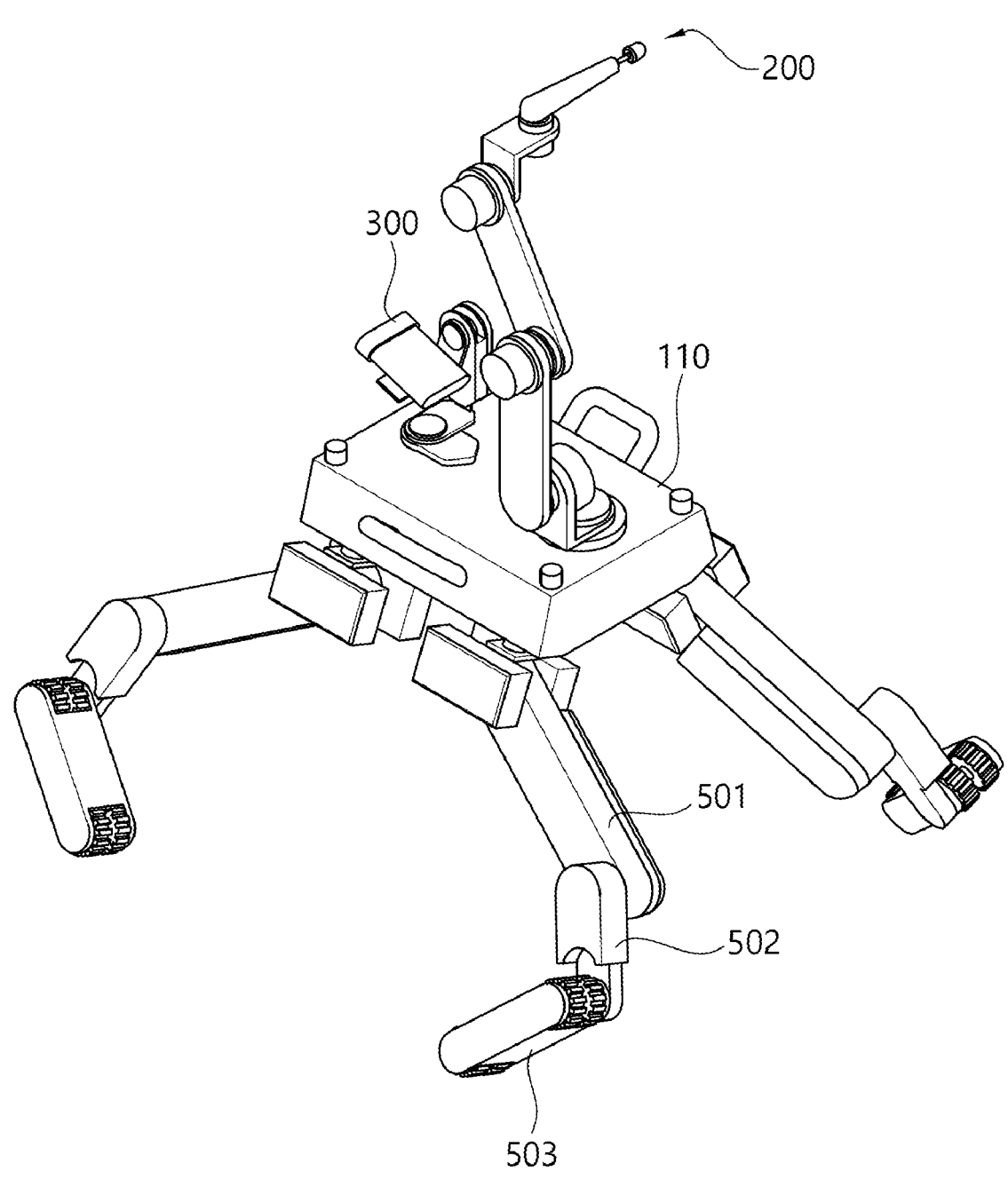
FIG. 4 is a perspective view showing the walking posture of the pipe evaluation robot according to the preferred embodiment of the present disclosure.

FIG. 4 is a perspective view showing the walking posture of the pipe evaluation robot according to the preferred embodiment of the present disclosure.

As shown in FIG. 4, the pipe evaluation robot 100 according to a preferred embodiment of the present disclosure may walk on four legs in a walking mode.

For example, the first transfer frame 501 may be disposed to be inclined downward at a predetermined angle with respect to the body while it is axially rotated in the y-axis direction. The second transfer frame 502 may be disposed in a downward direction, and the transfer member 503 may be disposed to be inclined at a predetermined angle with respect to the second transfer frame 502 to change its posture so that at least one area comes into contact with the ground.

Accordingly, the pipe evaluation robot 100 may drive the first transfer unit 510, the second transfer unit 520, the third transfer unit 530, and the fourth transfer unit 540 together or selectively. That is, the pipe evaluation robot 100 may allow the first transfer frame 501 to be lifted up and down in the z-axis direction and to be axially rotated between the x-axis direction and the y-axis direction and may walk on four legs.

Meanwhile, the resonance sound analysis module 600 may be mounted on the body 110 of the pipe evaluation robot 100. The resonance sound analysis module 600 enables the integrity evaluation of the pipe 10 based on signals provided from the plurality of acoustic measurement modules 400.

Figure 5:
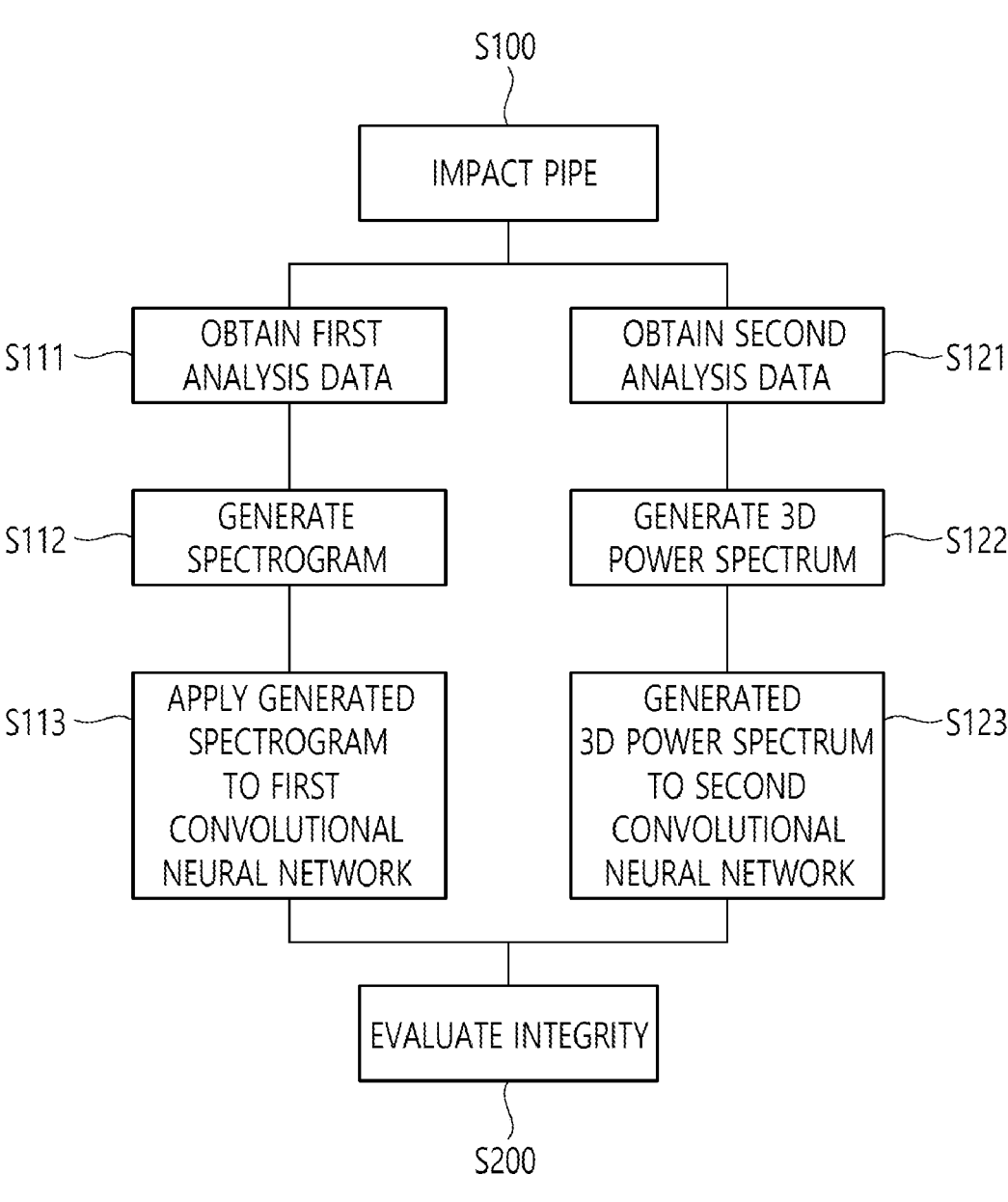
FIG. 5 is a flowchart showing a pipe evaluation method using the pipe evaluation robot according to the preferred embodiment of the present disclosure.
Figure 6:
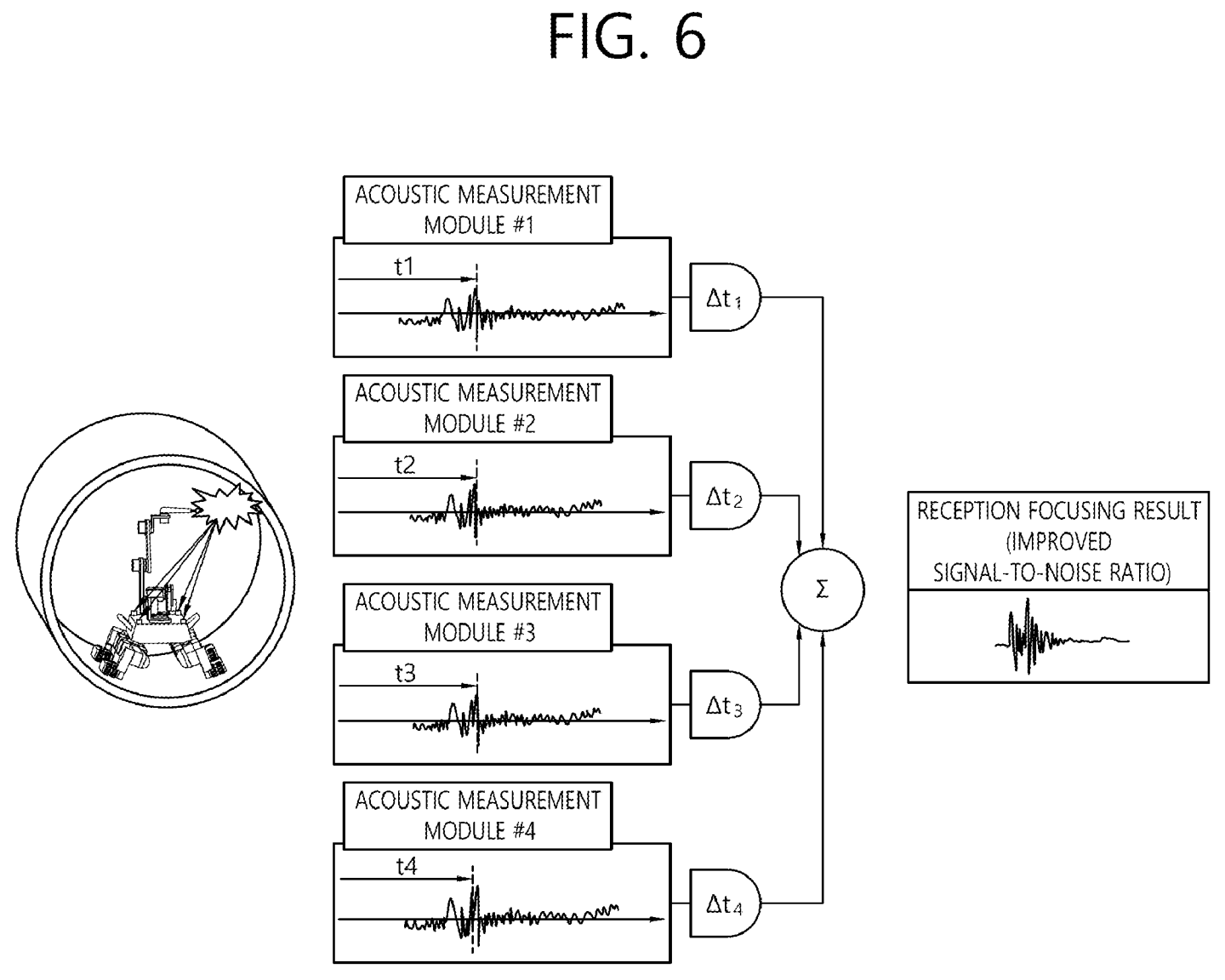
Figure 7:
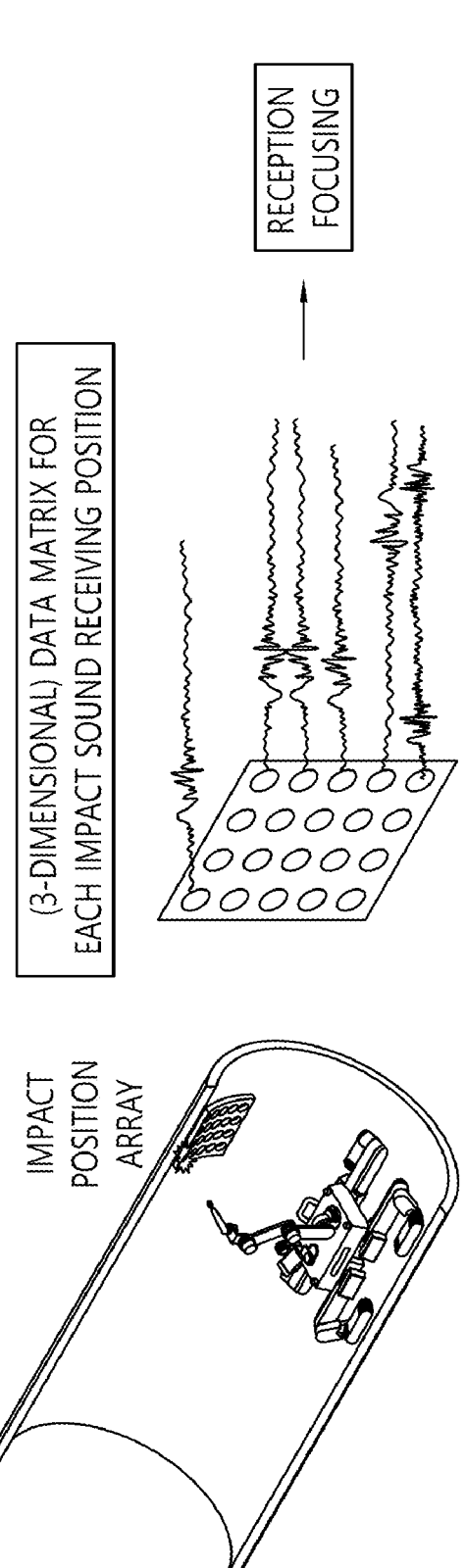
FIG. 7 is a conceptual diagram showing obtaining second analysis data using the pipe evaluation robot according to the preferred embodiment of the present disclosure.

FIG. 5 is a flowchart showing a pipe evaluation method using the pipe evaluation robot according to the preferred embodiment of the present disclosure, FIG. 6 is a conceptual diagram showing obtaining first analysis data using the pipe evaluation robot according to the preferred embodiment of the present disclosure; and FIG. 7 is a conceptual diagram showing obtaining second analysis data using the pipe evaluation robot according to the preferred embodiment of the present disclosure.

As shown in FIGS. 5 to 7, the pipe evaluation robot 100 according to a preferred embodiment of the present disclosure may impact the pipe 10 after being introduced into the pipe 10 to obtain a resonance sound. Then, the pipe evaluation robot 100 may generate a spectrogram and a 3D power spectrum based on the obtained data and may apply the same to a convolutional neural network (CNN) to determine the integrity of the pipe (10).

To this end, the pipe evaluation robot 100 may obtain data by obtaining first analysis data and obtaining second analysis data.

In obtaining the first analysis data, the pipe evaluation robot 100 may impact the pipe 10. Accordingly, the four acoustic measurement modules 400 may obtain an impact sound generated by impacting the pipe 10. At this time, as the four acoustic measurement modules 400 are disposed at different positions, there is a time delay caused by the difference in distance between the four acoustic measurement modules 400. Accordingly, the resonance sound analysis module 600 may perform reception focusing.

At this time, the resonance sound analysis module 600 may compensate for the difference in arrival time of the impact sounds input through each channel to each of the four acoustic measurement modules and then overlap a plurality of signals to generate the first analysis data in the form of waveform data with an improved signal-to-noise ratio. At this time, the four acoustic measurement modules 400 may be mounted in predetermined positions to obtain the first analysis data based on the time delay. That is, the positions of the four acoustic measurement modules 400 may be set in advance during the design and manufacturing of the pipe evaluation robot 100.

Meanwhile, in obtaining the second analysis data, the pipe evaluation robot 100 may impact the pipe 10 at a plurality of positions. At this time, the pipe evaluation robot 100 may impact the pipe 10 at the plurality of positions arbitrarily arranged on the inner surface of the pipe 10 to obtain a three-dimensional data matrix for each impact sound receiving position. Then, the resonance sound analysis module 600 may perform reception focusing. At this time, the resonance sound analysis module 600 may compensate for the difference in arrival time of the impact sounds input through each channel to each of the four acoustic measurement modules and then form a power spectrum array for each position based on the waveform data to generate the second analysis data in the form of a waveform data matrix.

Then, the pipe evaluation robot 100 may proceed with the pipe evaluation by applying a neural network to each of the first analysis data and the second analysis data.

First, the pipe evaluation robot 100 may generate a spectrogram and perform convolutional neural network analysis using the first analysis data in the form of waveform data.

FIG. 8 is a conceptual diagram showing generating a spectrogram and performing convolutional neural network analysis using the pipe evaluation robot according to the preferred embodiment of the present disclosure.

As shown in FIG. 8, the resonance sound analysis module 600 according to a preferred embodiment of the present disclosure may generate spectrogram data using the first analysis data in the form of waveform data. In this case, the spectrogram may be time-frequency composite data, in which the horizontal axis may represent the time and the vertical axis may represent the frequency. Accordingly, the resonance sound analysis module 600 may evaluate the integrity of the pipe 10 by inputting the generated spectrogram to a first convolutional neural network. In this case, the first convolutional neural network may have been learned by the spectrogram obtained by impacting the pipe 10.

Meanwhile, the pipe evaluation robot 100 may generate a 3D power spectrum and perform convolutional neural network analysis using the second analysis data in the form of a waveform data matrix.

Figure 9:
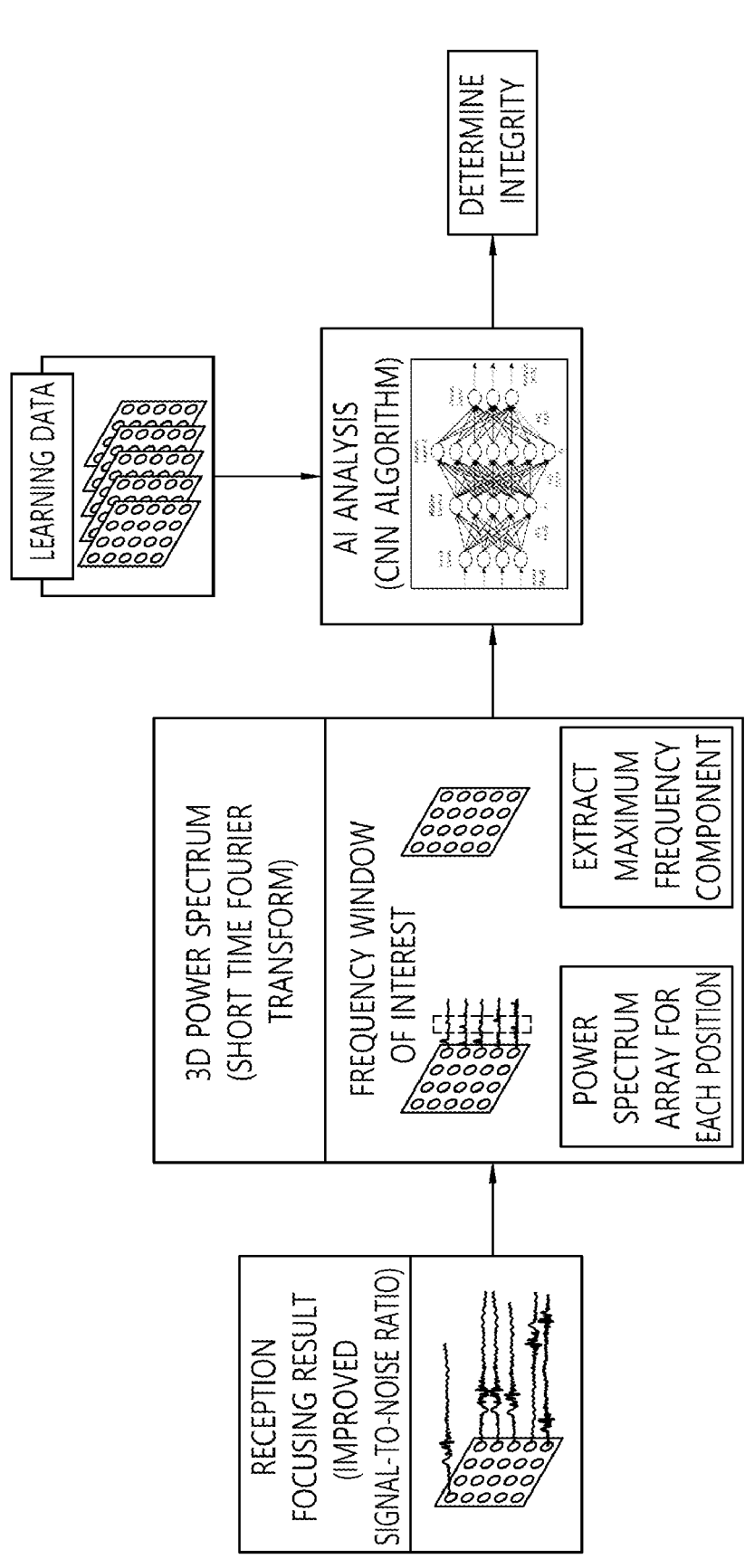
FIG. 9 is a conceptual diagram showing generating a 3D power spectrum and performing convolutional neural network analysis using the pipe evaluation robot according to the preferred embodiment of the present disclosure.

FIG. 9 is a conceptual diagram showing generating a 3D power spectrum and performing convolutional neural network analysis using the pipe evaluation robot according to the preferred embodiment of the present disclosure.

As shown in FIG. 9, the resonance sound analysis module 600 according to a preferred embodiment of the present disclosure may generate 3D power spectrum data using a waveform data matrix. In this case, the resonance sound analysis module may generate 3D power spectrum data by extracting a frequency region of interest, for example, a maximum frequency component, from the power spectrum array for each position. The 3D power spectrum data may be time-frequency composite data, in which the horizontal and vertical axes may represent the pipe impact position and the depth axis may represent the power spectrum. Accordingly, the resonance sound analysis module 600 may evaluate the integrity of the pipe 10 by inputting the generated 3D power spectrum data to a second convolutional neural network. In this case, the second convolutional neural network may have been learned by data generated in the same manner as in generating the 3D power spectrum data as described above.

Referring back to FIGS. 5 to 7, the pipe evaluation robot 100 may evaluate the integrity of the final pipe 10 based on the first analysis result obtained by generating the spectrogram and performing the convolutional neural network analysis and the second analysis result obtained by generating the 3D power spectrum and performing the convolutional neural network analysis.

However, this is for the purpose of illustrating the present embodiment, and the integrity of the pipe 10 can be evaluated only with the result values obtained by generating the spectrogram and performing the convolutional neural network analysis or the result values obtained by generating the 3D power spectrum and performing the convolutional neural network analysis.

As such, the pipe evaluation robot and the pipe evaluation method according to the present disclosure have the effect of reducing the occurrence of human errors and safety accidents through pipe evaluation using a robot and enabling accurate pipe evaluation.

An embodiment of the present disclosure described above and shown in the drawings should not be construed as limiting the technical spirit of the present disclosure. The protection scope of the present disclosure is limited only by the matters described in the claims, and those skilled in the art can improve and change the technical spirit of the present disclosure in various forms. Therefore, these improvements and changes will fall within the protection scope of the present disclosure as long as they are obvious to those skilled in the art.

The invention claimed is:

1. A pipe evaluation robot for evaluating the integrity of a pipe, the pipe evaluation robot comprising:

a body that is introduced into the pipe;

a transfer module that transfers the body inside the pipe;

an impact unit that is provided in the body to impact the pipe;

a plurality of acoustic measurement modules that are provided in the body to measure an impact sound generated when the impact unit impacts the pipe; and a resonance sound analysis module that converts impact sound information provided from the acoustic measurement modules into analysis data and applies the converted analysis data to a convolutional neural network (CNN) to determine the integrity of the pipe, wherein the resonance sound analysis module is configured to obtain first analysis data as the impact unit impacts a predetermined area and obtain second analysis data as the impact unit impacts a plurality of predetermined areas, wherein the resonance sound analysis module is configured to obtain a first analysis result by generating spectrogram data based on the first analysis data, apply the spectrogram data to a first convolutional neural network, obtain a second analysis result by generating 3D power spectrum data based on the second analysis data, and apply the 3D power spectrum data to a second convolutional neural network, and wherein the resonance sound analysis module is configured to determine the integrity of the pipe based on the first and second analysis results.

2. The pipe evaluation robot of claim 1, wherein in obtaining the first analysis data, the resonance sound analysis module compensates for a difference in arrival time of the impact sounds input to each of the plurality of acoustic measurement modules and then overlaps a plurality of signals to generate the first analysis data in the form of waveform data with an improved signal-to-noise ratio.

3. The pipe evaluation robot of claim 1, wherein in obtaining the second analysis data, the resonance sound analysis module obtains a three-dimensional data matrix for each impact sound receiving position, compensates for a difference in arrival time of the impact sounds input to each of the plurality of acoustic measurement modules, and then forms a power spectrum array for each position based on the waveform data to generate the second analysis data in the form of a waveform data matrix.

4. The pipe evaluation robot of claim 1, wherein the resonance sound analysis module generates the 3D power spectrum data by extracting a frequency region of interest from the waveform data matrix before applying the second analysis data to the second convolutional neural network.

5. The pipe evaluation robot of claim 1, wherein in generating the 3D power spectrum data, the resonance sound analysis module extracts a maximum frequency component from the waveform data matrix.

6. The pipe evaluation robot of claim 1, wherein the impact unit comprises:

an impact hammer that impacts the pipe; and an articulated robot arm that allows the impact hammer to be supported on the body and the impact hammer to be transferred in multiple directions.

7. The pipe evaluation robot of claim 6, wherein the articulated robot arm comprises:

a first robot arm of which one end is connected to the body and the other end extends upward from the body to be axially rotatable in a plane direction and in a vertical direction;

a second robot arm of which one end is connected to the other end of the first robot arm and the other end extends upward to be axially rotatable on the other end of the robot arm; and a third robot arm extending from the other end of the robot arm in a horizontal direction and axially rotatable in a plane direction, and wherein the impact hammer is mounted on the third robot arm.

8. The pipe evaluation robot of claim 1, wherein the transfer module switches to a driving mode or a walking mode.

9. The pipe evaluation robot of claim 8, wherein the transfer module comprises:

a first transfer unit that is selectively axially rotated toward the front and right sides in a lower area of the body;

a second transfer unit that is selectively axially rotated toward the front and left sides in the lower area of the body;

a third transfer unit that is selectively axially rotated toward the rear and right sides in the lower area of the body; and a fourth transfer unit that is selectively axially rotated toward the rear and left sides in the lower area of the body.

10. The pipe evaluation robot of claim 9, wherein each of the first to fourth transfer units comprises:

a first transfer frame that is connected to the lower area of the body to be axially rotated in the x-axis or y-axis direction and axially rotatable with respect to the body;

a second transfer frame that is connected to the first transfer frame and axially rotatable with respect to the first transfer frame, and a transfer member in the form of a caterpillar that is axially rotatably connected to the second transfer frame.

11. The pipe evaluation robot of claim 1, further comprising a camera module provided on the body, wherein the camera module is axially rotatably mounted on a top of the body.

12. A pipe evaluation method for evaluating the integrity of a pipe, the pipe evaluation method comprising:

introducing a pipe evaluation robot into the pipe;

impacting, by an impact unit of the pipe evaluation robot, the pipe;

measuring, by a plurality of acoustic measurement modules provided in the pipe evaluation robot, an impact sound generated when the impact unit impacts the pipe; and converting, by a resonance sound analysis module, impact sound information provided from the acoustic measurement modules into analysis data and applying the converted analysis data to a convolutional neural network (CNN) to determine the integrity of the pipe, wherein converting the impact sound information comprises:

obtaining first analysis data as the impact unit impacts a predetermined area and obtaining second analysis data as the impact unit impacts a plurality of predetermined areas, producing a first analysis result by generating spectrogram data based on the first analysis data and applying the spectrogram data to a first convolutional neural network, producing a second analysis result by generating 3D power spectrum data based on the second analysis data and applying the 3D power spectrum data to a second convolutional neural network, and determining the integrity of the pipe based on the first and second analysis results.

* * * * *